(12) United States Patent
Juneja et al.

(10) Patent No.: US 12,355,485 B2
(45) Date of Patent: Jul. 8, 2025

(54) SYSTEM AND METHOD FOR REAL TIME PROTECTION APPLICATIONS ON HYBRID CONTROLLER ARCHITECTURE

(71) Applicant: Infinera Corp., San Jose, CA (US)

(72) Inventors: Kapil Juneja, Karnataka (IN); Amit Satbhaiya, Kunadalahali (IN); Bryce Edwards, Sunnyvale, CA (US); Aref Modanlu, San Jose, CA (US)

(73) Assignee: Infinera Corporation, San Jose, CA (US)

( * ) Notice: Subject to any disclaimer, the term of this patent is extended or adjusted under 35 U.S.C. 154(b) by 245 days.

(21) Appl. No.: 18/319,093

(22) Filed: May 17, 2023

(65) Prior Publication Data

US 2023/0379050 A1    Nov. 23, 2023

Related U.S. Application Data

(60) Provisional application No. 63/343,044, filed on May 17, 2022.

(51) Int. Cl.
*H04B 10/032*    (2013.01)
*H04B 10/25*    (2013.01)

(52) U.S. Cl.
CPC ........... *H04B 10/032* (2013.01); *H04B 10/25* (2013.01)

(58) Field of Classification Search
CPC .............................. H04B 10/032; H04B 10/25
USPC ............................................................ 398/5
See application file for complete search history.

(56) References Cited

U.S. PATENT DOCUMENTS

| | | | | |
|---|---|---|---|---|
| 5,457,555 A * | 10/1995 | Moriyama | ............... | H04B 1/74 398/2 |
| 6,005,694 A * | 12/1999 | Liu | ................... | H04Q 11/0062 398/31 |
| 6,307,986 B1 * | 10/2001 | Duerksen | ............ | H04J 14/0295 385/24 |
| 8,467,676 B2 * | 6/2013 | Villarruel | ............ | H04J 14/0295 398/91 |
| 2002/0141332 A1 * | 10/2002 | Barnard | ................... | H04J 3/085 370/220 |
| 2006/0020857 A1 * | 1/2006 | Miller | ................... | H04B 10/564 714/30 |
| 2007/0036544 A1 * | 2/2007 | Fukashiro | .......... | H04J 14/0227 398/19 |
| 2015/0043904 A1 * | 2/2015 | Boduch | ................ | H04B 10/038 398/2 |
| 2020/0371295 A1 * | 11/2020 | Jones | ..................... | H04L 49/357 |
| 2022/0069903 A1 * | 3/2022 | Chen | ................... | H04B 10/0771 |

* cited by examiner

*Primary Examiner* — Dalzid E Singh

(57) ABSTRACT

A system, a line module in a terminal node of an optical network, and/or a method are described in which a first embedded device of a first line module transmits a first fault signal to a first real time processor of the first line module. In response, the first real time processor triggers the first embedded device to deactivate a first laser of a first coherent optical transceiver of the first line module and transmits a second fault signal to a second real time processor of a second line module. In response, the second real time processor triggers a second embedded device of the second line module to activate a second laser of a second coherent optical transceiver of the second line module. The first laser and the second laser may be operable to supply a first optical signal and a second optical signal, respectively.

20 Claims, 6 Drawing Sheets

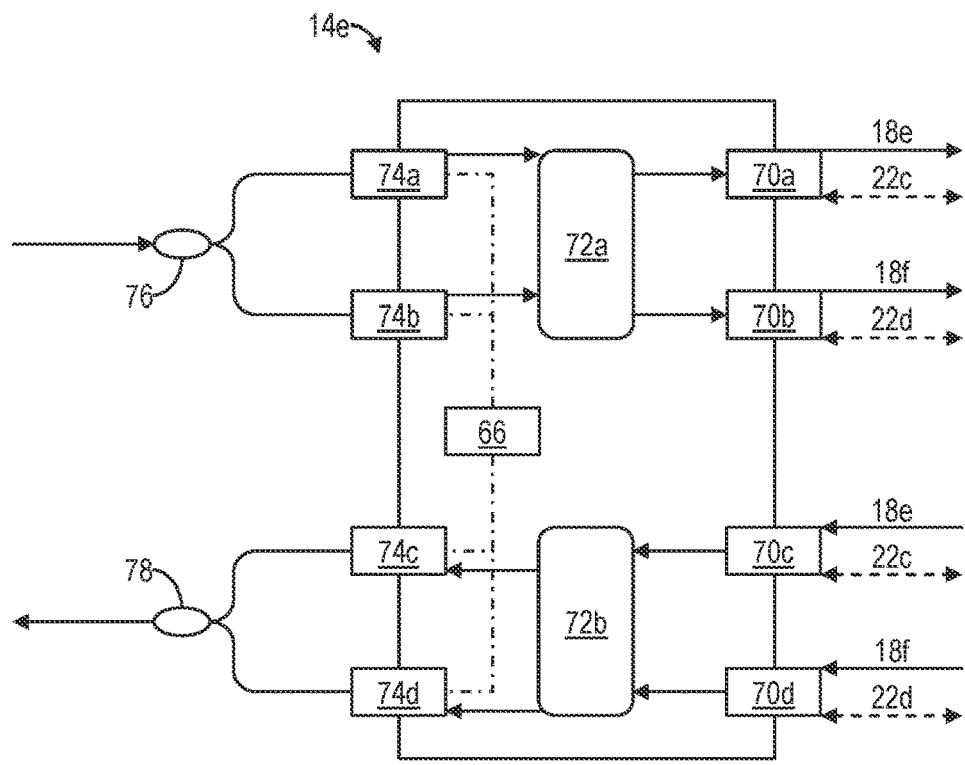
FIG. 3
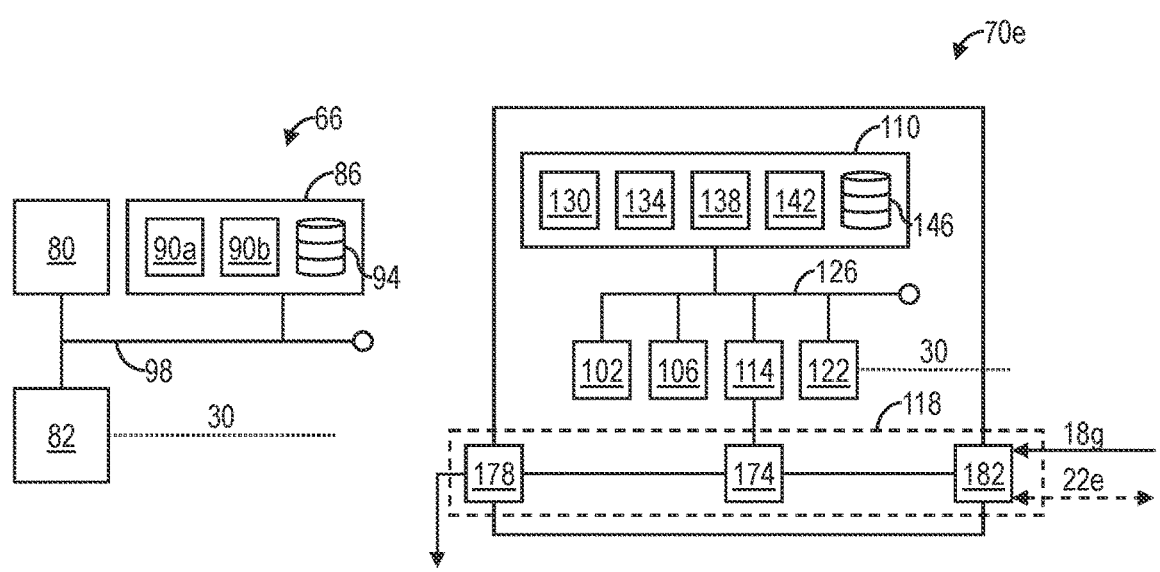
FIG. 4
FIG. 5

SYSTEM AND METHOD FOR REAL TIME PROTECTION APPLICATIONS ON HYBRID CONTROLLER ARCHITECTURE

CROSS-REFERENCE TO RELATED APPLICATIONS

This application claims the benefit of U.S. Provisional Patent Application No. 63/343,044, which was filed on May 17, 2022, the contents of which are incorporated herein by reference in their entirety.

BACKGROUND

Optical networking is a communication means that utilizes signals encoded in light to transmit information (e.g., data) as an optical signal in various types of telecommunications networks. Optical networking may be used in relatively short-range networking applications such as in a local area network (LAN) or in long-range networking applications spanning countries, continents, and oceans. Generally, optical networks utilize optical amplifiers, a light source such as lasers or LEDs, and wave division multiplexing to enable high-bandwidth, transcontinental communication.

Optical networks are a critical component of the global Internet backbone. This infrastructure acts as the underlay, providing the plumbing for all other communications to take place (e.g., access, metro, and long-haul). In the traditional 7-layer OSI model, Optical networks constitute the Layer 1 functions, providing digital transmission of bit streams transparently across varying distances over a chosen physical media (in this case, optical). Optical networks also encompass an entire class of devices (which are referred to as Layer 0), which purely deal with optical photonic transmission and wavelength division multiplexing (WDM). This includes amplification, (re-)generation and optical add/drop multiplexing (OADM). The most widely adopted Layer 1/Layer 0 transport networking technologies today, referred to as Optical Transport Networks (OTN), are based on ITU-T standards. Both these classes of networks are connection-oriented and circuit-switched in nature.

Optical networks may experience a failure between a transmitting node (i.e., an upstream or head-end node), and a receiving node (i.e., a downstream or tail-end node). Traditionally, optical networks, such as integrated coherent DWDM networks, handling these failures may implement protection schemes at either the Layer 0 OSI layer or the Layer 1 OSI layer, which, when activated, causes the optical signal on a protection path between the head-end node and the tail-end node to be selected by the tail-end node, instead of the optical signal on a working path between the same nodes. Switching the optical signal from the working path to the protection path is preferably performed within 50 milliseconds (ms). Currently, such protection schemes generally follow either a hardware-based approach or a software-based approach.

While both approaches aim to provide a high level of network availability and reliability, hardware-based protection schemes typically offer faster protection and minimal downtime. However, hardware-based protection schemes are also generally inflexible, making it difficult to expand the scope of protection beyond a single board. Further, such approaches often incur high maintenance and regression costs. On the other hand, software-based protection schemes are more flexible and easier (i.e., cheaper) to implement, making them suitable for smaller networks or environments with lower risk levels. However, software-based protection schemes are also slower than hardware-based protection schemes.

SUMMARY

The problem of balancing the costs and benefits of hardware-based protection schemes and software-based protection schemes may be solved by the systems and methods described herein.

In one aspect, the present disclosure is directed to a system, comprising an optical network comprising a first optical fiber and a second optical fiber, the first optical fiber being a component of a working path in the optical network, the second optical fiber being a component of a protection path in the optical network; and a terminal node, comprising: a first line module comprising a first coherent optical transceiver comprising a first laser operable to supply a first optical signal, a first line port connected to the first optical fiber, a first embedded device, and a first real time processor dedicated to protection signaling mechanisms within the optical network; and a second line module comprising a second coherent optical transceiver comprising a second laser operable to supply a second optical signal, a second line port connected to the second optical fiber, a second embedded device, and a second real time processor dedicated to protection signaling mechanisms of the optical network; wherein the first embedded device is operable to detect a fault in the working path and, responsive to detecting the fault, generate a first fault signal, and transmit the first fault signal to the first real time processor; wherein the first real time processor is operable to receive the first fault signal and, responsive to receiving the first fault signal, trigger the first embedded device to deactivate the first laser, generate a second fault signal, and transmit the second fault signal to the second real time processor; and wherein the second real time processor is operable to receive the second fault signal and, responsive to receiving the second fault signal, trigger the second embedded device to activate the second laser.

In another aspect, the present disclosure is directed to a line module in a terminal node of an optical network, comprising: a coherent optical transceiver comprising a laser operable to supply an optical signal, the laser having an activation state being activated or deactivated; a line port configured to be connected to an optical fiber; an embedded device; and a real time processor dedicated to protection signaling mechanisms within the optical network; wherein the embedded device is operable to detect a fault in the optical fiber and, responsive to detecting the fault, transmit a first fault signal to the real time processor; and wherein the real time processor is operable to receive one of the first fault signal and a second fault signal, and, responsive to receiving the first fault signal or the second fault signal, trigger the embedded device to switch the activation state of the laser, and, further responsive to receiving the first fault signal, generate a third fault signal and transmit the third fault signal.

In yet another aspect, the present disclosure is directed to a method, comprising: detecting, by a first embedded device of a first line module comprising a first line port connected to a first optical fiber, a fault in the first optical fiber; responsive to detecting the fault, generating, by the first embedded device, a first fault signal and transmitting, by the first embedded device, the first fault signal to a first real time processor of the first line module; responsive to receiving the first fault signal, triggering, by the first real time processor, the first embedded device to deactivate a first laser of a first coherent optical transceiver of the first line module, the first laser being operable to supply a first optical signal, and transmitting, by the first real time processor, a second fault signal to a second real time processor of a second line module comprising a second line port connected to a second optical fiber; and responsive to receiving the second fault signal, triggering, by the second real time processor, a second embedded device of the second line module to activate a second laser of a second coherent optical transceiver of the second line module, the second laser being operable to supply a second optical signal.

Implementations of the above techniques include methods, apparatus, systems, and computer program products. One such computer program product is suitably embodied in a non-transitory machine-readable medium that stores instructions executable by one or more processor. The instructions are configured to cause the one or more processor to perform the above-described actions.

The details of one or more implementation of the subject matter of this specification are set forth in the accompanying drawings and the description below. Other aspects, features, and advantages will become apparent from the description, the drawings, and the claims.

BRIEF DESCRIPTION OF DRAWINGS

The accompanying drawings, which are incorporated in and constitute a part of this specification, illustrate one or more implementation described herein and, together with the description, explain these implementations. The drawings are not intended to be drawn to scale, and certain features and certain views of the figures may be shown exaggerated, to scale, or in schematic in the interest of clarity and conciseness. Not every component may be labeled in every drawing. Like reference numerals in the figures may represent and refer to the same or similar element or function. In the drawings:

FIG. 3 is a diagrammatic view of an exemplary terminal node for use in the optical network shown in FIG. 1;

FIG. 4 is a diagrammatic view of an exemplary controller module for use in the terminal node shown in FIG. 3;

FIG. 5 is a diagrammatic view of an exemplary line module for use in the terminal node shown in FIG. 3;

DETAILED DESCRIPTION

Figure 1:
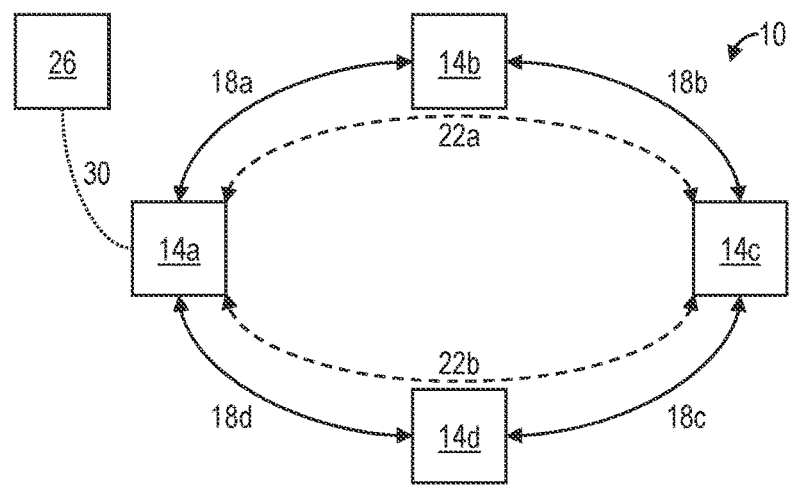
FIG. 1 is a diagrammatic view of an exemplary optical network constructed in accordance with the present disclosure.

The following detailed description of example embodiments refers to the accompanying drawings. The same reference numbers in different drawings may identify the same or similar elements.

As used herein, the terms "comprises," "comprising," "includes," "including," "has," "having", or any other variation thereof are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

As used herein, qualifiers like "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

As used herein, the term "substantially" means that the subsequently described parameter, event, or circumstance completely occurs or that the subsequently described parameter, event, or circumstance occurs to a great extent or degree. For example, the term "substantially" means that the subsequently described parameter, event, or circumstance occurs at least 90% of the time, or at least 91%, or at least 92%, or at least 93%, or at least 94%, or at least 95%, or at least 96%, or at least 97%, or at least 98%, or at least 99%, of the time, or means that the dimension or measurement is within at least 90%, or at least 91%, or at least 92%, or at least 93%, or at least 94%, or at least 95%, or at least 96%, or at least 97%, or at least 98%, or at least 99%, of the referenced dimension or measurement.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Circuitry, as used herein, may be analog and/or digital components, or one or more suitably programmed processor (e.g., microprocessors) and associated hardware and software, or hardwired logic. Also, "components" may perform one or more function. The term "component" may include hardware, such as a processor (e.g., microprocessor), a combination of hardware and software, and/or the like. Software may include one or more computer executable instruction that when executed by one or more component cause the component to perform a specified function. It should be understood that the algorithms described herein may be stored on one or more non-transitory memory. Exemplary non-transitory memory may include random access memory, read only memory, flash memory, and/or the like. Such non-transitory memory may be electrically based, optically based, and/or the like.

As used herein, the terms "network-based," "cloud-based," and any variations thereof are intended to include the provision of configurable computational resources on demand via interfacing with a computer and/or computer network, with software and/or data at least partially located on a computer and/or computer network.

As used herein, a "route" and/or an "optical route" may correspond to an optical path and/or an optical light path. For example, an optical route may specify a path along which light is carried between two or more network entities.

As used herein, an optical link may be an optical fiber, an optical channel, an optical super-channel, a super-channel group, an optical carrier group, a set of spectral slices, an optical control channel (e.g., sometimes referred to herein as an optical supervisory channel, or an "OSC"), an optical data channel (e.g., sometimes referred to herein as "BAND"), and/or any other optical signal transmission link.

In some implementations, an optical link may carry an optical super-channel. A super-channel may include multiple channels multiplexed together using wavelength-division multiplexing in order to increase transmission capacity. Various quantities of channels may be combined into super-channels using various modulation formats to create different super-channel types having different characteristics. Additionally, or alternatively, an optical link may be a super-channel group. A super-channel group may include multiple super-channels multiplexed together using wavelength-division multiplexing in order to increase transmission capacity.

Additionally, or alternatively, an optical link may carry a set of spectral slices. A spectral slice (a "slice") may represent a spectrum of a particular size in a frequency band (e.g., 12.5 gigahertz ("GHz"), 6.25 GHz, etc.). For example, a 4.8 terahertz ("THz") frequency band may include 384 spectral slices, where each spectral slice may represent 12.5 GHz of the 4.8 THz spectrum. A super-channel may include a different quantity of spectral slices depending on the super-channel type.

Amplified spontaneous emission (ASE) is light produced by spontaneous emission that has been optically amplified by the process of stimulated emission in a gain medium. ASE is light that is incoherent and causes perturbations on the optical link. Every optical amplifier, e.g., Erbium-Doped Fiber Amplifiers (EDFAs) and Raman amplifiers, emit ASE. If an amplified spontaneous emission power level is too high relative to the transmission signal power level, the transmission signal in the fiber optic cable will be unreadable due to a low signal to noise ratio.

As used herein, the C-Band is a band of light having a wavelength between 1528.6 nm and 1566.9 nm. The L-Band is a band of light having a wavelength between 1569.2 nm and 1609.6 nm. Because the wavelength of the C-Band is smaller than the wavelength of the L-Band, the wavelength of the C-Band may be described as a short, or a shorter, wavelength relative to the L-Band. Similarly, because the wavelength of the L-Band is larger than the wavelength of the C-Band, the wavelength of the L-Band may be described as a long, or a longer, wavelength relative to the C-Band. Further, the O-band is a band of light having a wavelength between 1260 nm to 1360 nm.

As used herein, a reconfigurable add-drop multiplexer (ROADM) node refers to an all-optical subsystem that enables remote configuration of wavelengths at any ROADM node. A ROADM is software-provisionable so that a network operator can choose whether a wavelength is added, dropped, or passed through the ROADM node. The technologies used within the ROADM node include wavelength blocking, planar light wave circuit (PLC), and wavelength selective switching (WSS)—though the WSS has become the dominant technology. A ROADM system is a metro/regional wavelength division multiplexing (WDM) or long-haul dense wavelength division multiplexing (DWDM) system that includes a ROADM node. ROADMs are often talked about in terms of degrees of switching, ranging from a minimum of two degrees to as many as eight degrees, and occasionally more than eight degrees. A "degree" is another term for a switching direction and is generally associated with a transmission fiber pair. A two-degree ROADM node switches in two directions, typically called East and West. A four-degree ROADM node switches in four directions, typically called North, South, East, and West. In a WSS-based ROADM network, each degree requires an additional WSS switching element. So, as the directions switched at a ROADM node increase, the ROADM node's cost increases.

As used herein, a digital fault or fault signal is a fault condition that is reported and may be determined after coherent detection in an optical transponder (e.g., Line card). The fault condition may include one or more of the following: Loss of Frame (LOS), based on one or more of an Out of Frame (OOF) defect, an Out of Multi-frame (OOM) defect, or a Loss of Multi-frame (LOM) defect; a Backward Defect Indication (BDI) fault, a Remote BDI (RBDI) fault, a Backward signal degrade (BSD) fault, an Alarm Indication Signal (AIS), an Open Connection Indication (OCI), and/or a remote BSD (RBSD) fault. A BDI is an indication sent upstream by a downstream node detecting LOF. This information may be carried in an SDFEC overhead.

Referring now to FIG. 1, shown therein is a diagrammatic view of an exemplary optical network 10 constructed in accordance with the present disclosure. The optical network 10 may include a plurality of optical nodes 14a-n. In the implementation shown, the optical network 10 includes four optical nodes 14a-d, including a first optical node 14a, a second optical node 14b, a third optical node 14c, and a fourth optical node 14d; however, in other implementations, the optical network 10 may include more or less than four optical nodes 14a-n.

The optical network 10 may include any type of network that uses light as a transmission medium. For example, the optical network 10 may include a fiber-optic based network, an optical transport network, a light-emitting diode network, a laser diode network, an infrared network, a wireless optical network, a wireless network, combinations thereof, and/or other types of optical networks.

Particular ones of the optical nodes 14a-n may be denoted as terminal nodes for an optical signal being transmitted within the optical network 10. Each of the terminal nodes may either transmit or receive the optical signal being transmitted within the optical network 10. The terminal nodes may include a head-end node (also referred to as a "source node") and a tail-end node (also referred to as a "destination node"). In the implementation shown, the first optical node 14a (hereinafter the "head-end node 14a") is functioning as a head-end node and the third optical node 14c (hereinafter the "tail-end node 14c") is functioning as a tail-end node (the head-end node 14a and the tail-end node 14c, collectively the "terminal nodes 14a, 14c").

Other ones of the optical nodes 14a-n between the terminal nodes 14a, 14c may be denoted as intermediate nodes. In the implementation shown, the second optical node 14b (hereinafter the "first intermediate node 14b") and the fourth optical node 14d (hereinafter the "second intermediate node 14d") are functioning as intermediate nodes (the first intermediate node 14b and the second intermediate node 14d, collectively the "intermediate nodes 14b, 14d").

Each of the optical nodes 14a-n may be implemented in a variety of ways, non-exclusive examples of which including optical line terminals (OLTs), optical cross connects (OXCs), optical line amplifiers (OAs), optical add/drop multiplexer (OADMs) and/or reconfigurable optical add/drop multiplexers (ROADMs), interconnected by way of intermediate links. OLTs may be used at either end of a connection or intermediate link. OADM/ROADMs may be used to add, terminate and/or reroute wavelengths or fractions of wavelengths. Optical nodes are further described in U.S. Pat. No. 7,995,921 titled "Banded Semiconductor Optical Amplifiers and Waveblockers", U.S. Pat. No. 7,394,953 titled "Configurable Integrated Optical Combiners and Decombiners", and U.S. Pat. No. 8,223,803, titled "Programmable Time Division Multiplexed Switching," the entire contents of each of which are hereby incorporated herein by reference in its entirety.

Each of the optical nodes 14a-n may be connected to each other by optical links 18a-n. Each of the optical links 18a-n may be a fiber optic cable and may be uninterrupted (i.e., having no break in the fiber optic cable) or may have one or more optical node 14a-n disposed thereon and positioned in between each of the optical nodes 14a-n. In the implementation shown, the optical network 10 includes four optical links 18a-d, including a first optical link 18a between the head-end node 14a and the first intermediate node 14b, a second optical link 18b between the first intermediate node 14b and the tail-end node 14c, a third optical link 18c between the second intermediate node 14d and the tail-end node 14c, and a fourth optical link 18d between the head-end node 14a and the second intermediate node 14d; however, in other implementations, the optical network 10 may include more or less than four optical links 18a-n.

An optical signal being transmitted within the optical network 10 from the head-end node 14a to the tail-end node 14c may traverse one or more paths through the optical network 10. In the implementation shown, the optical network 10 includes a working path 22a and a protection path 22b. The working path 22a may be formed between the head-end node 14a and the tail-end node 14c through the first intermediate node 14b and includes the first optical link 18a and the second optical link 18b as components thereof. The protection path 22b may be formed between the head-end node 14a and the tail-end node 14c through the second intermediate node 14d and includes the third optical link 18c and the fourth optical link 18d as components thereof.

While the working path 22a and the protection path 22b are described as traversable by an optical signal being transmitted from the head-end node 14a to the tail-end node 14c, each of the working path 22a and the protection path 22b may be bidirectional; that is, each of the working path 22a and the protection path 22b may be traversable by an optical signal being transmitted from the tail-end node 14c to the head-end node 14a.

The working path 22a may be described as a default path for the optical signal to traverse; that is, the working path 22a may be a data path configured to carry data traffic while there is no failure or fault signal on the working path 22a. The protection path 22b may be described as a backup path for the optical signal to traverse if the optical signal is unable to traverse the working path 22a; that is, the protection path 22b may be a data path configured to carry data traffic while there is a failure or fault signal on the working path 22a.

If there is a failure or fault signal on the working path 22a, then the working path 22a may be said to have failed. As described further below, if the working path 22a is failed, then data traffic may be directed from the working path 22a to the protection path 22b. If the failure or fault signal is resolved, then the working path 22a may be said to have recovered from failure. The working path 22a may be revertive or non-revertive. Revertive means that data traffic is directed from the protection path 22b to the working path 22a after the working path 22a recovers from failure, while non-revertive means that data traffic is not directed from the protection path 22b to the working path 22a after the working path 22a recovers from failure.

In some implementations, a user may interact with a computer system 26 (e.g., via a user device (not shown)) that may be used to communicate with one or more of the optical nodes 14a-n via a communication network 30. Each element of the computer system 26 may be partially or completely network-based or cloud-based and may or may not be located in a single physical location.

As further described below, in some implementations, the computer system 26 may comprise a processor and a memory having a data store that may store data such as network element version information, firmware version information, sensor data, system data, metrics, logs, tracing, and the like in a raw format as well as transformed data that may be used for tasks such as reporting, visualization, analytics, signal routing, power loading operations and/or coordination, etc. The data store may include structured data from relational databases, semi-structured data, unstructured data, time-series data, and binary data. The data store may be a database, a remote accessible storage, or a distributed filesystem. In some implementations, the data store may be a component of an enterprise network.

In some implementations, the computer system 26 is connected to one or more of the optical nodes 14a-n via the communication network 30. In this way, the computer system 26 may communicate with the optical nodes 14a-n, and may, via the communication network 30, transmit to or receive data from the optical nodes 14a-n. In other implementations, the computer system 26 may be integrated into each of the optical nodes 14a-n and/or may communicate with one or more pluggable card within the optical nodes 14a-n. In some implementations, the computer system 26 may be a remote network element.

The communication network 30 may permit bi-directional communication of information and/or data between the computer system 26 and/or the optical nodes 14a-n. The communication network 30 may interface with the computer system 26 and/or the optical nodes 14a-n in a variety of ways. For example, in some implementations, the communication network 30 may interface by optical and/or electronic interfaces, and/or may use a plurality of network topographies and/or protocols including, but not limited to, Ethernet, TCP/IP, circuit switched path, combinations thereof, and/or the like. The communication network 30 may utilize a variety of network protocols to permit bi-directional interface and/or communication of data and/or information between the computer system 26 and/or the optical nodes 14a-n.

The communication network 30 may be almost any type of network. For example, in some implementations, the communication network 30 may be a version of an Internet network (e.g., exist in a TCP/IP-based network). In one implementation, the communication network 30 is the Internet. It should be noted, however, that the communication network 30 may be almost any type of network and may be implemented as the World Wide Web (or Internet), a local area network (LAN), a wide area network (WAN), a metropolitan network, a wireless network, a cellular network, a Bluetooth network, a Global System for Mobile Communications (GSM) network, a code division multiple access (CDMA) network, a 3G network, a 4G network, an LTE network, a 5G network, a satellite network, a radio network, an optical network, a cable network, a public switched telephone network, an Ethernet network, combinations thereof, and/or the like.

If the communication network 30 is the Internet, a primary user interface of the computer system 26 may be delivered through a series of web pages or private internal web pages of a company or corporation, which may be written in hypertext markup language, JavaScript, or the like, and accessible by the user. It should be noted that the primary user interface of the computer system 26 may be another type of interface including, but not limited to, a Windows-based application, a tablet-based application, a mobile web interface, a VR-based application, an application running on a mobile device, and/or the like. In one implementation, the communication network 30 may be connected to the user device (not shown), the computer system 26, and the optical nodes 14a-n.

The number of devices and/or networks illustrated in FIG. 1 is provided for explanatory purposes. In practice, there may be additional devices and/or networks, fewer devices and/or networks, different devices and/or networks, or differently arranged devices and/or networks than are shown in FIG. 1. Furthermore, two or more of the devices illustrated in FIG. 1 may be implemented within a single device, or a single device illustrated in FIG. 1 may be implemented as multiple, distributed devices. Additionally, or alternatively, one or more of the devices of the optical network 10 may perform one or more functions described as being performed by another one or more of the devices of the optical network 10. Devices of the computer system 26 may interconnect via wired connections, wireless connections, or a combination thereof. For example, in one embodiment, the user device and the computer system 26 may be integrated into the same device; that is, the user device may perform functions and/or processes described as being performed by the computer system 26, described below in more detail.

Figure 2:
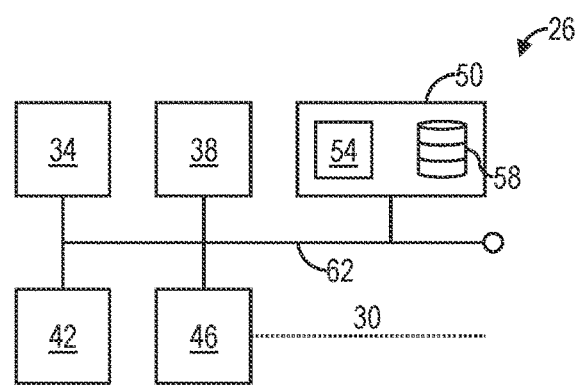
FIG. 2 is a diagrammatic view of an exemplary user device for use in the optical network shown in FIG. 1.

Referring now to FIG. 2, shown therein is a diagrammatic view of an exemplary computer system 26 constructed in accordance with the present disclosure. In some implementations, the computer system 26 may include, but is not limited to, implementations as a personal computer, a cellular telephone, a smart phone, a network-capable television set, a tablet, a laptop computer, a desktop computer, a network-capable handheld device, a server, a digital video recorder, a wearable network-capable device, a virtual reality/augmented reality device, and/or the like.

The computer system 26 may include one or more input device 34 (hereinafter the "input device 34"), one or more output device 38 (hereinafter the "output device 38"), one or more processor 42 (hereinafter the "processor 42"), one or more communication device 46 (hereinafter the "communication device 46") capable of interfacing with the communication network 30, one or more non-transitory processor-readable medium (hereinafter the "memory 50") storing processor-executable code and/or software application(s) 54 including, for example, a web browser capable of accessing a website and/or communicating information and/or data over a wireless or wired network (e.g., the communication network 30) and/or the like, and a data store 58. The input device 34, the output device 38, the processor 42, the communication device 46, and the memory 50 may be connected via a path 62 such as a data bus that permits communication among the components of the computer system 26.

The input device 34 may be capable of receiving information input from the user, another computer, and/or the processor 42, and transmitting such information to other components of the computer system 26 and/or the communication network 30. The input device 34 may include, but is not limited to, implementation as a keyboard, a touchscreen, a mouse, a trackball, a microphone, a camera, a fingerprint reader, an infrared port, a slide-out keyboard, a flip-out keyboard, a cell phone, a PDA, a remote control, a fax machine, a wearable communication device, a network interface, combinations thereof, and/or the like, for example.

The output device 38 may be capable of outputting information in a form perceivable by the user, another computer system, and/or the processor 42. For example, implementations of the output device 38 may include, but are not limited to, a computer monitor, a screen, a touchscreen, a speaker, a website, a television set, a smart phone, a PDA, a cell phone, a fax machine, a printer, a laptop computer, a haptic feedback generator, a network interface, combinations thereof, and the like, for example. It is to be understood that in some exemplary embodiments, the input device 34 and the output device 38 may be implemented as a single device, such as, for example, a touchscreen of a computer, a tablet, or a smartphone. It is to be further understood that as used herein the term "user" is not limited to a human being, and may comprise a computer, a server, a website, a processor, a network interface, a user terminal, a virtual computer, combinations thereof, and/or the like, for example.

In some implementations, the processor 42 may comprise one or more processor 42 working together, or independently, to read and/or execute processor executable code and/or data, such as stored in the memory 50. The processor 42 may be capable of creating, manipulating, retrieving, altering, and/or storing data structures into the memory 50. Each element of the computer system 26 may be partially or completely network-based or cloud-based, and may or may not be located in a single physical location.

Exemplary implementations of the processor 42 may include, but are not limited to, a digital signal processor (DSP), a central processing unit (CPU), a field programmable gate array (FPGA), a microprocessor, a multi-core processor, an application specific integrated circuit (ASIC), combinations, thereof, and/or the like, for example. The processor 42 may be capable of communicating with the memory 50 via the path 62 (e.g., data bus). The processor 42 may be capable of communicating with the input device 34 and/or the output device 38.

The processor 42 may be further capable of interfacing and/or communicating with the optical nodes 14a-n via the communication network 30 using the communication device 46. For example, the processor 42 may be capable of communicating via the communication network 30 by exchanging signals (e.g., analog, digital, optical, and/or the like) via one or more ports (e.g., physical or virtual ports) using a network protocol (e.g., TCP/IP) to provide information to the optical network 10 (i.e., the optical nodes 14*a*-*n*) and receive information from the optical network 10 (i.e., the optical nodes 14*a*-*n*).

The memory 50 may store a software application 54 that, when executed by the processor 42, causes the computer system 26 to perform an action such as communicate with, or control, one or more component of the computer system 26, the optical network 10 (e.g., the optical nodes 14*a*-*n*), and/or the communication network 30.

In some implementations, the memory 50 may be located in the same physical location as the computer system 26, and/or one or more memory 50 may be located remotely from the computer system 26. For example, the memory 50 may be located remotely from the computer system 26 and communicate with the processor 42 via the communication network 30. Additionally, when more than one memory 50 is used, a first memory may be located in the same physical location as the processor 42, and additional memory may be located in a location physically remote from the processor 42. Additionally, the memory 50 may be implemented as a "cloud" non-transitory processor-readable storage memory (i.e., one or more of the memory 50 may be partially or completely based on or accessed using the communication network 30).

In some implementations, the data store 58 may be a time-series database, a relational database, or a non-relational database. Examples of such databases include DB2®, Microsoft® Access, Microsoft® SQL Server, Oracle®, mySQL, PostgreSQL, MongoDB, Apache Cassandra, InfluxDB, Prometheus, Redis, Elasticsearch, TimescaleDB, and/or the like. It should be understood that these examples have been provided for the purposes of illustration only and should not be construed as limiting the presently disclosed inventive concepts. The data store 58 may be centralized or distributed across multiple systems.

Referring now to FIG. 3, shown therein is a diagrammatic view of an exemplary terminal node 14*e* constructed in accordance with the present disclosure. The terminal node 14*e* may be an implementation of the head-end node 14*a* or the tail-end node 14*c*. The terminal node 14*e* generally comprises a controller module 66, one or more line module 70*a*-*n* (hereinafter the "line modules 70*a*-*n*"), one or more ROADM 72*a*-*n* (hereinafter the "ROADMs 72*a*-*n*"), one or more Tributary Interface Module (TIM) 74*a*-*n* (hereinafter the "TIMs 74*a*-*n*"), an optical power splitter 76, and an optical power coupler/combiner 78.

In the implementation shown, the terminal node 14*e* includes a first line module 70*a* (hereinafter the "first working line module 70*a*"), a second line module 70*b* (hereinafter the "first protection line module 70*b*"), a third line module 70*c* (hereinafter the "second working line module 70*c*"), and a fourth line module 70*d* (hereinafter the "second protection line module 70*d*"); however, in other implementations, the terminal node 14*e* may include more or less than four line modules 70*a*-*n*.

In the implementation shown, the terminal node 14*e* includes a first ROADM 72*a* and a second ROADM 72*b*; however, in other implementations, the terminal node 14*e* may include more or less than two ROADMs 72*a*-*n*.

In the implementation shown, the terminal node 14*e* includes a first TIM 74*a* (hereinafter the "first working TIM 74*a*"), a second TIM 74*b* (hereinafter the "first protection TIM 74*b*"), a third TIM 74*c* (hereinafter the "second working TIM 74*c*"), and a fourth TIM 74*d* (hereinafter the "second protection TIM 74*d*"); however, in other implementations, the terminal node 14*e* may include more or less than four TIMs 74*a*-*n*.

The first working line module 70*a* and the second working line module 70*c* may be in optical communication with a first optical link 18*e*, which may be a component of a working path 22*c* of the optical network 10, such that the first working line module 70*a* and the second working line module 70*c* may transmit and receive an optical signal on the working path 22*c*, respectively. The first protection line module 70*b* and the second protection line module 70*d* may be in optical communication with a second optical link 18*f*, which may be a component of a protection path 22*d* of the optical network 10, such that the first protection line module 70*b* and the second protection line module 70*d* may transmit and receive an optical signal on the protection path 22*d*, respectively.

Optical signals traveling in a transmit direction may enter the optical power splitter 76 where they continue to both of the first working TIM 74*a* and the first protection TIM 74*b*. The optical power splitter 76 may be a 50:50 optical power splitter, meaning that an optical signal entering the optical power splitter 76 may be split such that the first working TIM 74*a* receives the optical signal with half of the original power and the first protection TIM 74*b* receives the optical signal with half of the original power.

Optical signals traveling in a receive direction on one of the first optical link 18*e* (i.e., the working path 22*c*) and the second optical link 18*f* (i.e., the protection path 22*d*) may enter the terminal node 14*e* via one of the second working line module 70*c* and the second protection line module 70*d*. The optical signals may then enter the second ROADM 72*b* before the optical signal from the second working line module 70*c* continues to the second working TIM 74*c* and the optical signal from the second protection line module 70*d* continues to the second protection TIM 74*d*. The optical signals may then continue to the power coupler/combiner 78.

As described further below, traffic selection may be performed by the controller module 66 activating either of the first work TIM 74*a* or the first protection TIM 74*b* in the transmit direction or either of the second work TIM 74*c* or the second protection TIM 74*d* in the receive direction. Each of the TIMs 74*a*-*d* may include a client laser, and when the client laser of the first working TIM 74*a* is activated by the controller module 66, the traffic may be transmitted on the first optical link 18*e* (i.e., the working path 22*c*) by the first working line module 70*a* via the first ROADM 72*a*. Conversely, when the client laser of the first working TIM 74*a* is not activated, the traffic may be transmitted on the second optical link 18*f* (i.e., the protection path 22*d*) by the first protection line module 70*b* via the first ROADM 74*a*.

Referring now to FIG. 4, shown therein is a diagrammatic view of an exemplary controller module 66 constructed in accordance with the present disclosure. The controller module 66 may include one or more processor 80 (hereinafter the "controller processor 80"), one or more communication device 82 (hereinafter the "communication device 82") capable of interfacing with the communication network 30, and one or more non-transitory processor-readable medium (hereinafter the "memory 86") storing processor-executable code and/or software application(s) 90, including, for example, a graphical user interface (GUI) application 90*a* (shown in FIG. 6) and a control plane application 90*b* (shown in FIG. 6), and a data store 94. The controller processor 80, the communication device 82, and the memory 86 may be connected via a path 98 such as a data bus that permits communication among the components of the controller module 66.

In some implementations, the controller processor 80 may comprise one or more processor working together, or independently, to read and/or execute processor executable code and/or data, such as stored in the memory 86. The controller processor 80 may be capable of creating, manipulating, retrieving, altering, and/or storing data structures into the memory 86. Each element of the controller module 66 may be partially or completely network-based or cloud-based, and may or may not be located in a single physical location.

Exemplary implementations of the controller processor 80 may include, but are not limited to, a digital signal processor (DSP), a central processing unit (CPU), a field programmable gate array (FPGA), a microprocessor, a multi-core processor, an application specific integrated circuit (ASIC), combinations, thereof, and/or the like, for example. The controller processor 80 may be capable of communicating with the memory 86 via the path 98 (e.g., data bus).

The controller processor 80 may be further capable of interfacing and/or communicating with the line modules 70a-n via the communication network 30 using the communication device 82. For example, the controller processor 80 may be capable of communicating via the communication network 30 by exchanging signals (e.g., analog, digital, optical, and/or the like) via one or more ports (e.g., physical or virtual ports) using a network protocol (e.g., TCP/IP) to provide information to the line modules 70a-n and receive information from the line modules 70a-n.

In some implementations, the memory 86 may be located in the same physical location as the controller module 66, and/or one or more memory 86 may be located remotely from the controller module 66. For example, the memory 86 may be located remotely from the controller module 66 and communicate with the controller processor 80 via the communication network 30. Additionally, when more than one memory 86 is used, a first memory may be located in the same physical location as the controller processor 80, and additional memory may be located in a location physically remote from the controller processor 80. Additionally, the memory 86 may be implemented as a "cloud" non-transitory processor-readable storage memory (i.e., one or more of the memory 86 may be partially or completely based on or accessed using the communication network 30).

In some implementations, the data store 94 may be a time-series database, a relational database, or a non-relational database. Examples of such databases include DB2®, Microsoft® Access, Microsoft® SQL Server, Oracle®, mySQL, PostgreSQL, MongoDB, Apache Cassandra, InfluxDB, Prometheus, Redis, Elasticsearch, TimescaleDB, and/or the like. It should be understood that these examples have been provided for the purposes of illustration only and should not be construed as limiting the presently disclosed inventive concepts. The data store 94 may be centralized or distributed across multiple systems.

A user may provide input to the controller module 66 (e.g., via the user device (not shown) and/or the computer system 26) indicative of a protection group. A protection group may comprise one or more of a source node (e.g., the head-end node 14a shown in FIG. 1), a destination node (e.g., the tail-end node 14c shown in FIG. 1), a working path (e.g., the working path 22a shown in FIG. 1), and a protection path (e.g., the protection path 22b shown in FIG. 1). Each of the working path and the protection path may be signified by a protection unit, which is an atomic unit of signal monitoring for protection event detection. As described further below, responsive to receiving the input from the user, the controller processor 80 may store data indicative of the protection group in the data store 94 and/or may publish a protection group signal indicative of the protection group to a protection group data stream.

The controller module 66 may be operable to monitor a connection status of the line modules 70a-n (i.e., plugged in or plugged out) and a control plane state of the communication device 82. As described further below, the connection status and the control plane state may be provided to the controller module 66 by an embedded device of one or more of the line modules 70a-n.

Referring now to FIG. 5, shown therein is a diagrammatic view of an exemplary line module 70e constructed in accordance with the present disclosure. The line module 70e may be an implementation of the first working line module 70a, the first protection line module 70b, the second working line module 70c, or the second protection line module 70d. The line module 70e may have one or more non-real time processor 102 (hereinafter the "application CPU 102"), one or more real-time processor 106 (hereinafter the "real-time CPU 106"), one or more non-transitory processor-readable medium 110 (hereinafter the "shared memory 110"), one or more embedded device 114 (hereinafter the "FPGA 114"), one or more optical hardware 118 (hereinafter the "optical hardware 118"), and one or more communication device 122 (hereinafter the "communication device 122"), wherein the optical hardware 118 comprises a coherent optical transceiver 174, a system port 178, and a line port 182. The application CPU 102, the real-time CPU 106, the shared memory 110, the FPGA 114, and the communication device 122 may be connected via a path 126 such as a data bus that permits communication among the components of the line module 70e.

The coherent optical transceiver 174 may be an "add" transceiver or a "drop" transceiver. Further, the coherent optical transceiver 174 may comprise multiple drop transceivers and multiple add transceivers and may be configured to service channels across multiple ROADM degrees.

The application CPU 102 may be operable to provide non-real time processing of configuration and status handling for each real-time application being executed by the real-time CPU 106 and perform one or more non-real time task associated with the line module 70e (e.g., non-real time reboot synchronization). To that end, the application CPU 102 may be operable to execute one or more microservice 130 (hereinafter the "microservices 130") stored in the memory 110. As described further below, the microservices 130 may be loosely coupled, self-contained processes operable to be executed independently (i.e., in separate containers, such as Docker containers) by the application CPU 102. At least one of the microservices 130 may be operable to provide the non-real time processing of configuration and status handling, the non-real time reboot synchronization, and/or the like, for example. The microservices 130 may serve as a hardware abstraction layer (HAL) providing an interface between the control plane application 90b and the hardware of the line modules 70a-n.

The application CPU 102 may be operable to subscribe to a protection group data stream, obtain a protection group signal identifying a protection group via the protection group data stream, and store data indicative of the protection group in the shared memory 110.

The real-time CPU 106 may be dedicated to protection signaling mechanisms within the optical network 10. To that end, the real-time CPU 106 may be operable to execute one or more software application 134 (hereinafter the "real-time applications 134") stored in the memory 110. As described further below, the real-time applications 134 may be single- or multi-threaded C/C++ applications operable to be executed in real-time by the real-time CPU 106 and may include, for example, a Y-cable protection FSM application 134a (hereinafter the "Y-cable FSM 134a") (shown in FIG. 9).

As described further below, the real-time CPU 106 may implement a network protocol (e.g., TCP/IP stack) to communicate with, for example, other line modules 70a-n connected to the same controller module 66 as the line module 70e.

The application CPU 102 and the real-time CPU 106 may be separate physical processors. In some implementations, the application CPU 102 and/or the real-time CPU 106 may each comprise one or more processor working together, or independently, to read and/or execute processor executable code and/or data, such as stored in the shared memory 110. The application CPU 102 and/or the real-time CPU 106 may be capable of creating, manipulating, retrieving, altering, and/or storing data structures into the shared memory 110. Each element of the line module 70e may be partially or completely network-based or cloud-based, and may or may not be located in a single physical location.

Exemplary implementations of the application CPU 102 and/or the real-time CPU 106 may include, but are not limited to, a digital signal processor (DSP), a central processing unit (CPU), a field programmable gate array (FPGA), a microprocessor, a multi-core processor, an application specific integrated circuit (ASIC), combinations, thereof, and/or the like, for example. The application CPU 102 and/or the real-time CPU 106 may be capable of communicating with the shared memory 110 via the path 126 (e.g., data bus).

The application CPU 102 and/or the real-time CPU 106 may be further capable of interfacing and/or communicating with the controller module 66 via the communication network 30 using the communication device 122. For example, the application CPU 102 and/or the real-time CPU 106 may be capable of communicating via the communication network 30 by exchanging signals (e.g., analog, digital, optical, and/or the like) via one or more ports (e.g., physical or virtual ports) using a network protocol (e.g., TCP/IP) to provide information to the controller module 66 and receive information from the controller module 66.

As described above, the shared memory 110 may store the microservices 130 for execution by the application CPU 102 and the real-time applications 134 for execution by the real-time CPU 106. Further, as described further below, the shared memory 110 may store one or more real-time operating system (RTOS) platform library 138 (hereinafter the "RTOS platform library 138"), one or more device driver 142 for operating and/or controlling the various components of the line module 70e, and a data store 146.

Examples of the RTOS platform library include Deos, embOS, FreeRTOS®, INTEGRITY RTOS, Keil RTX, LynxOS®, MQX, Nucleus® RTOS, QNX® Neutrino RTOS, PikeOS, SAFERTOS®, Azure® RTOS ThreadX®, Micriµm OS, VxWorks®, Zephyr®, and/or the like.

In some implementations, the data store 146 may include a time-series database, a relational database, or a non-relational database. Examples of such databases include DB2®, Microsoft® Access, Microsoft® SQL Server, Oracle®, mySQL, PostgreSQL, MongoDB, Apache Cassandra, InfluxDB, Prometheus, Redis, Elasticsearch, TimescaleDB, and/or the like. It should be understood that these examples have been provided for the purposes of illustration only and should not be construed as limiting the presently disclosed inventive concepts. The data store 146 may be centralized or distributed across multiple physical systems.

The data store 146 may store information (e.g., configuration information) received from, for example, the control plane application 90b. Further, in some implementations, the data store 146 may include one or more channel to which one or more of the microservices 130 may publish information (e.g., state management information, configuration information, operational information, streaming information, and/or notification semantics) and to which one or more of the microservices 130 may subscribe. In this way, the data store 146 may serve as an inter-process communication (IPC) framework for communication between the control plane application 90b and the microservices 130.

The controller plane application 90b and the microservices 130 may communicate the information using a remote procedure call (RPC) framework, such as gRPC developed by Google LLC, having its principal place of business in Mountain View, California. The RPC framework may utilize a serialization format for encoding and decoding data, such as Protobuf also developed by Google LLC.

Employing a microservice architecture as described herein allows for quicker and smaller sized updates, separation of service impacting and non-service impacting updates, independent and quick development and testing of the various components of the network 10, and addition and expansion of features in live updates.

It should be understood that these examples have been provided for the purposes of illustration only and should not be construed as limiting the presently disclosed inventive concepts.

In some implementations, the shared memory 110 may be located in the same physical location as the line module 70e, and/or one or more shared memory 110 may be located remotely from the line module 70e. For example, the shared memory 110 may be located remotely from the line module 70e and communicate with the application CPU 102 and/or the real-time CPU 106 via the communication network 30. Additionally, when more than one shared memory 110 is used, a first shared memory may be located in the same physical location as the application CPU 102 and/or the real-time CPU 106, and additional memory may be located in a location physically remote from the application CPU 102 and/or the real-time CPU 106. Additionally, the shared memory 110 may be implemented as a "cloud" non-transitory processor-readable storage memory (i.e., one or more of the shared memory 110 may be partially or completely based on or accessed using the communication network 30).

The FPGA 114 may be configured to provide real-time deterministic fault detection. To that end, the FPGA 114 may be configured with a polling method and/or configured with interrupt-based reporting. The FPGA 114 may be operable to provide real-time fault detection. That is, the FPGA 114 may be operable to detect a fault in the optical link 18g and, responsive to detecting the fault, transmit a fault signal to the real-time CPU 106, for example. Fault detection may be performed by the FPGA 114 in a conventional manner known to those having ordinary skill in the art.

The line port 182 may be optically connected to an optical link 18g of the optical network 10, which may be a component of a path 22e in the optical network 10. The optical link 18g may be an implementation of any of the optical links 18a-n described herein. The path 22e may be an implementation of any of the paths 22a-n described herein, such as the working paths 22a and 22c shown in FIGS. 1 and 3, respectively, or the protection paths 22b and 22d, shown in FIGS. 1 and 3, respectively.

The number of devices illustrated in FIG. 5 are provided for explanatory purposes. In practice, there may be additional devices, fewer devices, different devices, or differently arranged devices than are shown in FIG. 5. Furthermore, two or more of the devices illustrated in FIG. 5 may be implemented within a single device, or a single device illustrated in FIG. 5 may be implemented as multiple, distributed devices. Additionally, one or more of the devices illustrated in FIG. 5 may perform one or more function described as being performed by another one or more of the devices illustrated in FIG. 5. Devices illustrated in FIG. 5 may interconnect via wired connections (e.g., fiber-optic connections).

Figure 6:
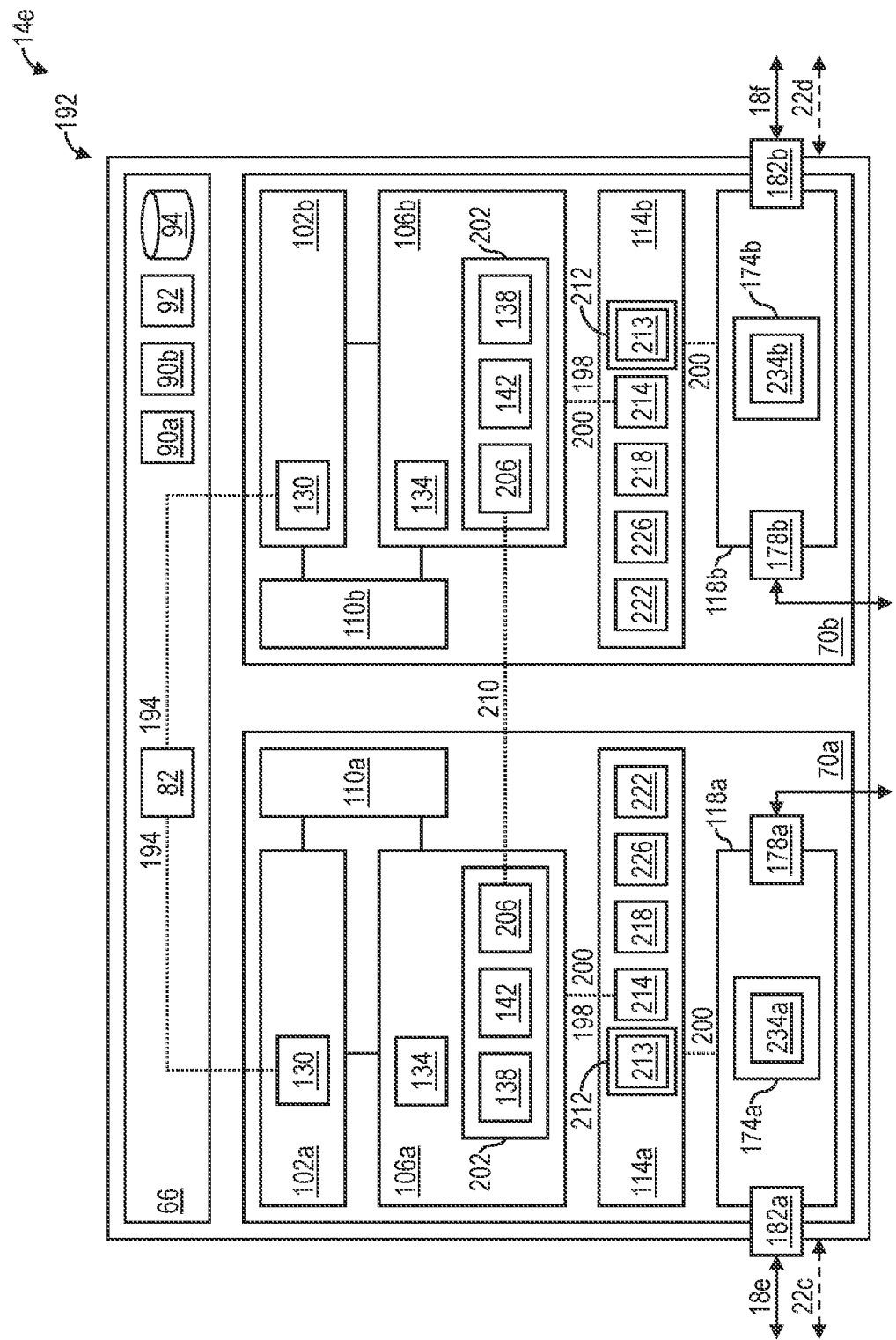
FIG. 6 is a diagrammatic view of a protection architecture for use in the terminal node shown in FIG. 3.

Referring now to FIG. 6, shown therein is a diagrammatic view of a protection architecture 192 of a terminal node (e.g., the terminal node 14e shown in FIG. 3) constructed in accordance with the present disclosure.

As shown in FIG. 6, the working line module 70a may comprise a first application CPU 102a (hereinafter the "working application CPU 102a"), a first real-time CPU 106a (hereinafter the "working real-time CPU 106a"), a first shared memory 110a (hereinafter the "working shared memory 110a"), a first FPGA 114a (hereinafter the "working FGPA 114a") and a first optical hardware 118a (hereinafter the "working optical hardware 118a"). The working optical hardware 118a may comprise a first line port 182a (hereinafter the "working line port 182a") optically connected to the first optical link 18e, which is a component of the working path 22c of the optical network 10, a first system port 178a (hereinafter the "working system port 178a"), and a first transceiver 174a (hereinafter the "working transceiver 174a") comprising a first laser 234a (hereinafter the "working laser 234a") described in further detail below in reference to FIG. 7A.

As further shown in FIG. 6, the protection line module 70b may comprise a second application CPU 102b (hereinafter the "protection application CPU 102b"), a second real-time CPU 106b (hereinafter the "protection real-time CPU 106b"), a second shared memory 110b (hereinafter the "protection shared memory 110b"), a second FPGA 114b (hereinafter the "protection FGPA 114b"), and a second optical hardware 118b (hereinafter the "protection optical hardware 118b"). The protection optical hardware 118b may comprise a second line port 182b (hereinafter the "protection line port 182b") optically connected the second optical link 18f, which is a component of the protection path 22d of the optical network 10, a second system port 178b (hereinafter the "protection system port 178b"), and a second transceiver 174b (hereinafter the "protection transceiver 174b") comprising a second laser 234b (hereinafter the "protection laser 234b") described in further detail below in reference to FIG. 7A.

The microservices 130 executed by the working application CPU 102a and the protection application CPU 102b may exchange signals 194 with the controller module 66, which may include a protection group configuration signal indicative of a protection group being sent from the controller module 66 to the working application CPU 102a and the protection application CPU 102b, as well as a protection group status signal indicative of a status of the protection group being sent from one of the working application CPU 102a and the protection application CPU 102b to the controller module 66. In some implementations, the controller module 66 may publish the protection group signal to a protection group data stream, and the working application CPU 102a and the protection application CPU 102b may subscribe to the protection group data stream such that, when the controller module 66 publishes the signals 194 to the protection group data stream, the protection group configuration signal may be obtained by the working application CPU 102a and the protection application CPU 102b. In some implementations, the controller module 66 may communicate with the working line module 70a and the protection line module 70b via the communication network 30 using a remote procedure call (RPC) protocol.

The real-time applications 134 executed by the working real-time CPU 106a and the protection real-time CPU 106b may transmit and receive signals to and from the working FPGA 114a and the protection FPGA 114b, respectively. These signals may include fault signals 198 being sent from the FPGAs 114a, 114b to the real-time CPUs 106a, 106b, and control signals 200 being sent from the real-time CPUs 106a, 106b to the FPGAs 114a, 114b (the fault signals 198 and the control signals 200, collectively the "signals 198, 200"). In some implementations, one or more of the fault signals 198 and/or the control signals 200 is an interrupt signal.

Each of the working real-time CPU 106a and the protection real-time CPU 106b may also include a platform interface 202 comprising the RTOS platform library 138, the device drivers 142, and a TCP/IP stack 206 by which the working real-time CPU 106a and the protection real-time CPU 106b may communicate signals with each other using a network protocol (e.g., TCP/IP), which may include fault signals 210 being sent between the working real-time CPU 106a and the protection real-time CPU 106b.

Each of the working FPGA 114a and the protection FPGA 114b may include circuitry comprising: a random access memory (RAM) 212 (such as a static RAM) comprising one or more register 213 (hereinafter the "register 213") which may indicate the presence or absence of a fault in the optical links 18e and/or 18f; a hardware arbitrator 214 configured to manage flow of events (i.e., data indicative of an occurrence of an event) between one or more component of the working line module 70a and the protection line module 70b (e.g., to provide the fault signals 198 to the working real-time CPU 106a and the protection real-time CPU 106b and to provide the control signals 200 to the working optical hardware 118a and the protection optical hardware 118b); a hardware poller 218 configured to monitor and/or poll a register 213 for a fault in the optical links 18e and/or 18f; a laser controller 222 configured to control a laser 234 (shown in FIG. 7A) of the optical hardware 118; and a cross-connection (XCON) configurator 226 operable to determine whether a particular protection unit is capable of carrying optical traffic.

In some implementations, the hardware arbitrator 214 may give priority to certain signals (e.g., the control signals 200) over others (e.g., the fault signals 198) based on predetermined criteria. In some implementations, the hardware poller 218 may be provided with hold-off facility; that is, the hardware poller 218 may be configured to perform fault soaking (i.e., waiting a predetermined period of time before responding to detection of a fault). Fault soaking may be used when unstable network patches cause unreliable fault detection.

Figure 7A:
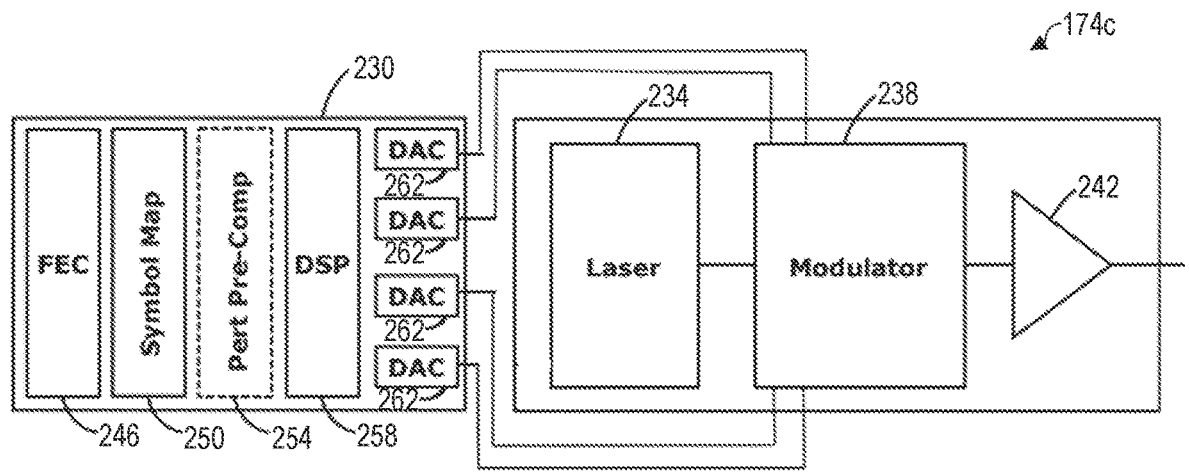
FIG. 7A is a diagrammatic view of an add transceiver for use in the line module shown in FIG. 5.

Referring now to FIG. 7A, shown therein is a diagrammatic view of an exemplary implementation of a transceiver 174c (hereinafter the "add transceiver 174c") constructed in accordance with the present disclosure. In the implementation shown, the add transceiver 174c is a coherent transmitter. The add transceiver 174c may comprise one or more transmitter processor circuit 230, one or more laser 234, one or more modulator 238, one or more semiconductor optical amplifier 242, and/or other components (not shown). In one implementation, the transceiver 174c may have a transceiver bandwidth, such as 100 GHz, 200 GHz, or 400 GHz, for example.

The laser 234 may be operable to supply an optical signal. Further, the laser 234 may have an activation state, which may be either activated or deactivated. The activation state of the laser 234 may be switched (i.e., from activated to deactivated or from deactivated to activated) by, for example, the FPGA 114.

The transmitter processor circuit 230 may have a Transmitter Forward Error Correction (FEC) circuitry 246, a Symbol Map circuitry 250, a transmitter perturbative pre-compensation circuitry 254, one or more transmitter digital signal processor (DSP) 258, and one or more digital-to-analogue converter (DAC) 262. The transmitter processor circuit 230 may be located in any one or more components of the add transceiver 174c, or separate from the components, and/or in any location(s) among the components. The transmitter processor circuit 230 may be in the form of one or more Application Specific Integrated Circuit (ASIC), which may contain one or more module and/or custom module.

Processed electrical outputs from the transmitter processor circuit 230 may be supplied to the modulator 238 for encoding data, such as user data, into optical signals generated and supplied to the modulator 238 from the laser 234. The semiconductor optical amplifier 242 receives, amplifies, and transmits the optical signal including encoded data in the spectrum. Processed electrical outputs from the transmitter processor circuit 230 may be supplied to other circuitry in the transmitter processor circuit 230, for example, clock and data modification circuitry. The laser 234, modulator 238, and/or semiconductor optical amplifier 242 may be coupled with a tuning element (e.g., a heater) (not shown) that can be used to tune the wavelength of an optical signal channel output by the laser 234, modulator 238, or semiconductor optical amplifier 242. In some implementations, a single one of the laser 234 may be shared by multiple add transceivers 174c.

Other possible components in the add transceiver 174c may include filters, circuit blocks, memory, such as non-transitory memory storing processor executable instructions, additional modulators, splitters, couplers, multiplexers, etc., as is well known in the art. The components may be combined, used, or not used, in multiple combinations or orders. Optical transmitters are further described in U.S. Patent Publication No. 2012/0082453, the content of which is hereby incorporated by reference in its entirety herein.

Figure 7B:
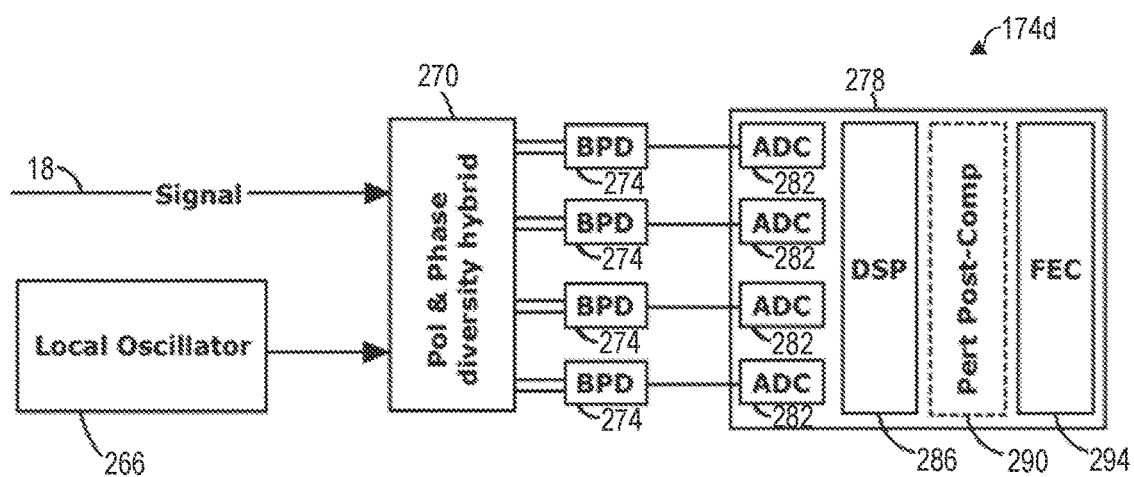
FIG. 7B is a diagrammatic view of a drop transceiver for use in the line module shown in FIG. 5.

Referring now to FIG. 7B, shown therein is a diagrammatic view of another exemplary implementation of a transceiver 174d (hereinafter the "drop transceiver 174d") constructed in accordance with the present disclosure. In the implementation shown, the drop transceiver 174d is a coherent receiver. The drop transceiver 174d may comprise one or more local oscillator 266, a polarization and phase diversity hybrid circuit 270 receiving the one or more channel from the optical signal and the input from the local oscillator 266, one or more balanced photodiode 274 that produces electrical signals representative of the one or more channel on the spectrum, and one or more receiver processor circuit 278. Other possible components in the drop transceiver 174d may include filters, circuit blocks, memory, such as non-transitory processor-readable memory storing processor-executable instructions, additional modulators, splitters, couplers, multiplexers, etc., as is well known in the art. The components may be combined, used, or not used, in multiple combinations or orders. The drop transceiver 174d may be implemented in other ways, as is well known in the art. Exemplary implementations of the drop transceiver 174d are further described in U.S. patent application Ser. No. 12/052,541, titled "Coherent Optical Receiver", the entire contents of which are hereby incorporated by reference.

The one or more receiver processor circuit 278 may comprise one or more analog-to-digital converter (ADC) 282 receiving the electrical signals from the balanced photodiodes 274, one or more receiver digital signal processor 286 (hereinafter the "receiver DSP 286"), receiver perturbative post-compensation circuitry 290, and receiver forward error correction circuitry 294 (hereinafter the "receiver FEC circuitry 294"). The receiver FEC circuitry 294 may apply corrections to the data, as is well known in the art. The one or more receiver processor circuit 278 and/or the one or more receiver DSP 286 may be located on one or more component of the drop transceiver 174d or separately from the components, and/or in any location(s) among the components. The receiver processor circuit 278 may be in the form of an Application Specific Integrated Circuit (ASIC), which may contain one or more module and/or custom module.

The one or more receiver DSP 286 may receive and process the electrical signals with multi-input-multiple-output (MIMO) circuitry, as described, for example, in U.S. Pat. No. 8,014,686, titled "Polarization demultiplexing optical receiver using polarization oversampling and electronic polarization tracking", the entire contents of which are hereby incorporated by reference herein. Processed electrical outputs from receiver DSP 286 may be supplied to other circuitry in the receiver processor circuit 278, such as the receiver perturbative post-compensation circuitry 290 and the receiver FEC circuitry 294.

Various components of the drop transceiver 174d may be provided or integrated, in one example, on a common substrate, such as the line modules 70a-n. Further integration is achieved by incorporating various optical demultiplexer designs that are relatively compact and conserve space on the surface of the substrate.

In use, the one or more channel of the spectrum may be subjected to optical non-linear effects between the add transceiver 174c and the drop transceiver 174d such that the spectrum received does not accurately convey carried data in the form that the spectrum was transmitted. In one embodiment, the add transceiver 174c and the drop transceiver 174d may be provided or integrated, in one example, on a common substrate such as the line modules 70a-n.

Figure 8:
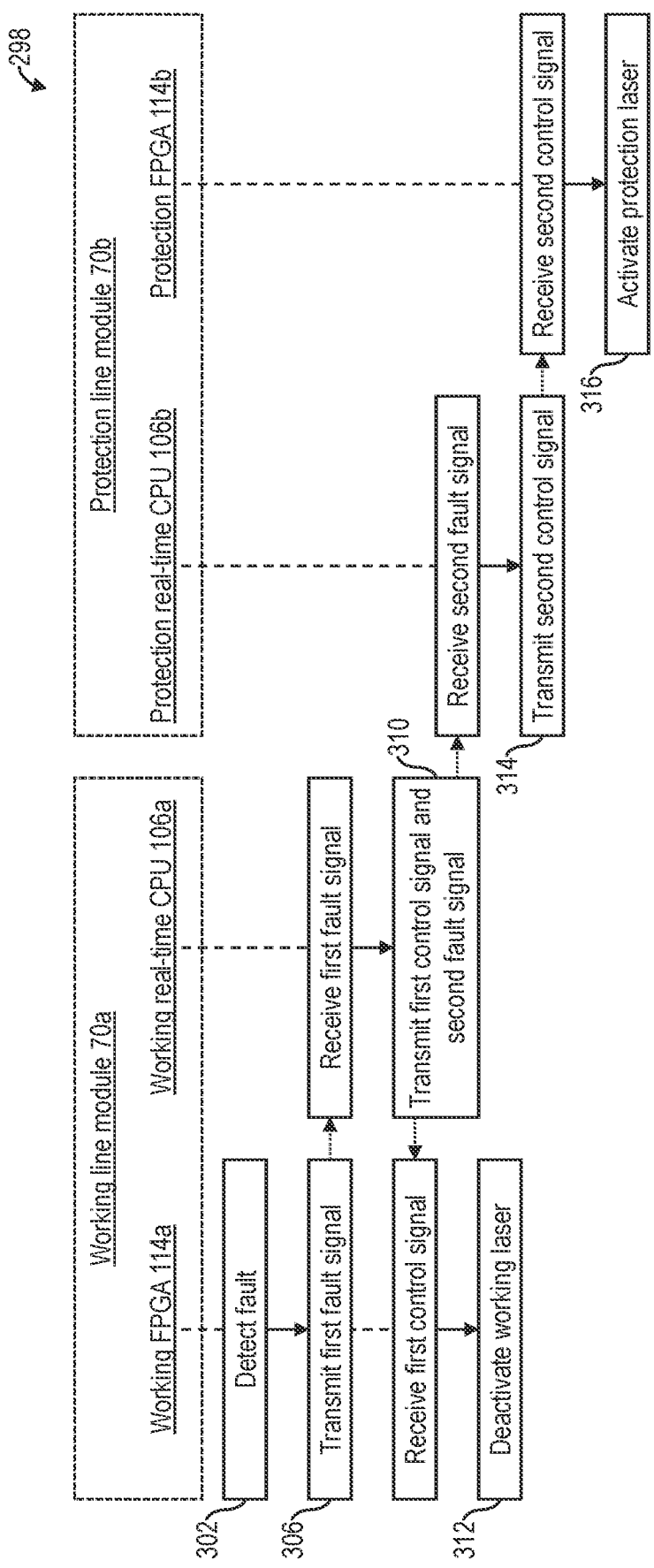
FIG. 8 is a workflow diagram of an exemplary method for providing hybrid protection switching.

Referring now to FIG. 8, shown therein is a diagrammatic view of a method 298 (hereinafter the "method 298") performed by the terminal node 14e shown in FIGS. 3 and 6. As shown in FIG. 8, the method 298 may comprise the steps of: detecting, by the working FPGA 114a of the working line module 70a comprising the working line port 182a optically connected to the first optical link 18e, a fault in the first optical link 18e (step 302); responsive to detecting the fault, generating, by the working FPGA 114a, a first fault signal 198 and transmitting, by the working FPGA 114a, the first fault signal 198 to the working real-time CPU 106a of the working line module 70a (step 306); responsive to receiving the first fault signal 198, triggering, by the working real-time CPU 106a, the working FPGA 114a to deactivate the working laser 234a of the working transceiver 174a of the working line module 70a, the working laser 234a being operable to supply a first optical signal, and transmitting, by the working real-time CPU 106a, a second fault signal 210 to the protection real-time CPU 106*b* of the protection line module 70*b* comprising the protection line port 182*b* connected to the second optical link 18*f* (step 310); and responsive to receiving the second fault signal 210, triggering, by the protection real-time CPU 106*b*, the protection FPGA 114*b* of the protection line module 70*b* to activate the protection laser 234*b* of the protection transceiver 174*b* of the protection line module 70*b*, the protection laser 234*b* being operable to supply a second optical signal (step 314).

The step of triggering the working FPGA 114*a* to deactivate the working laser 234*a* may comprise transmitting, by the working real-time CPU 106*a*, a first control signal 200 to the working FPGA 114*a* (step 310); and, responsive to receiving the first control signal 200, deactivating, by the working FPGA 114*a*, the working laser 234*a* (step 312).

The step of triggering the protection FPGA 114*b* to activate the protection laser 234*b* may comprise transmitting, by the protection real-time CPU 106*b*, a second control signal 200 to the protection FPGA 114*b* (step 310); and, responsive to receiving the second control signal 200, activating, by the protection FPGA 114*b*, the protection laser 234*b* (step 316).

In some implementations, the step of deactivating the working laser 234*a* (step 312) is further defined as switching the activation state of the working laser 234*a*. In such implementations, the step of activating the protection laser 234*b* (step 316) is also further defined as switching the activation state of the protection laser 234*b*.

Figure 9:
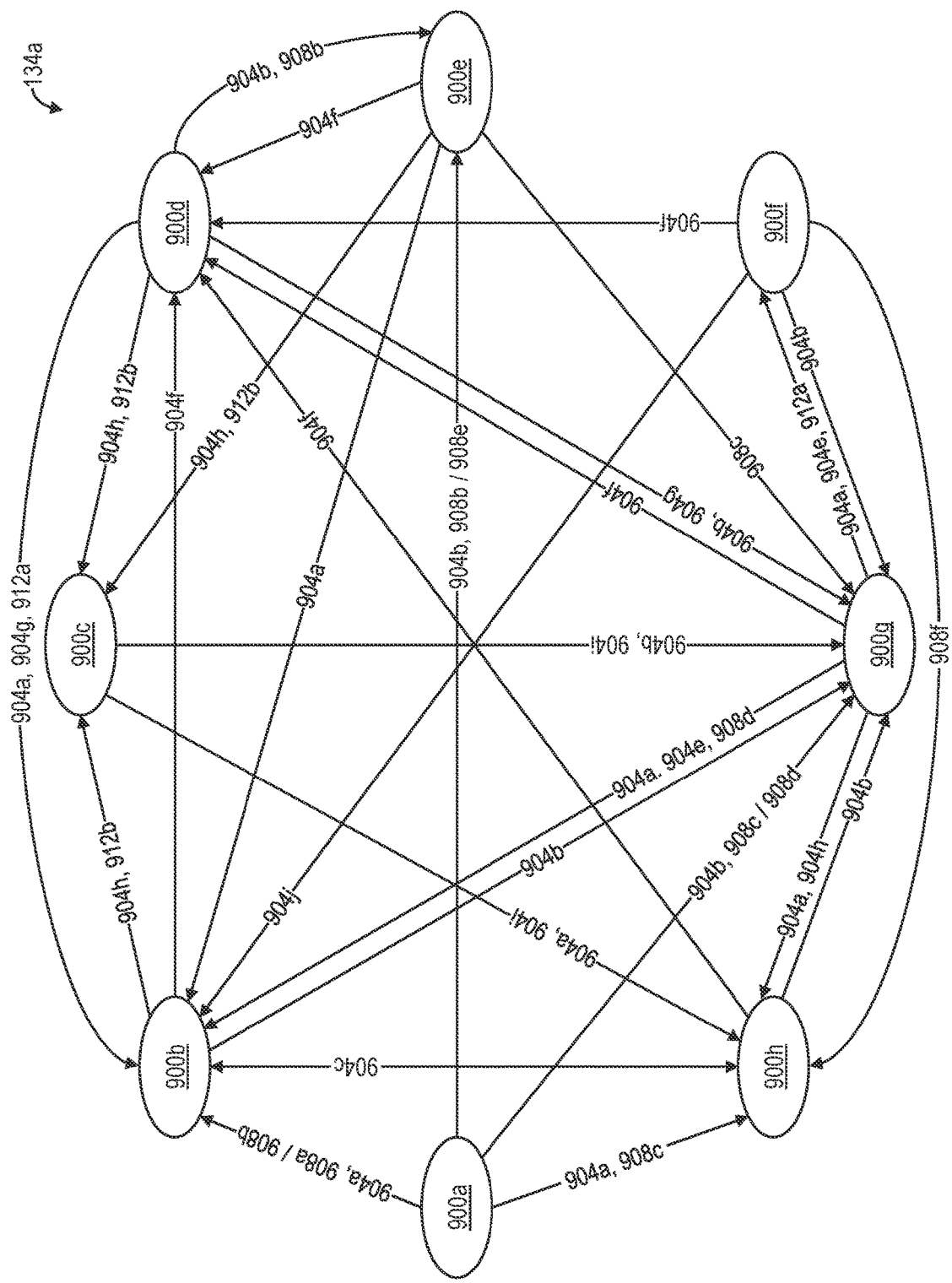
FIG. 9 is a state diagram of an exemplary Y-cable protection finite state machine constructed in accordance with the present disclosure.

Referring now to FIG. 9, shown therein is a diagrammatic view of the Y-cable FSM 134*a*. The Y-cable FSM 134*a* may be executed by the working real-time CPU 106*a*, in which case the Y-cable FSM 134*a* may be referred to as a Working FSM 134*a*, or the protection real-time CPU 106*b*, in which case the Y-cable FSM 134*a* may be referred to as a Protection FSM 134*a*.

Communication between the Working FSM 134*a* in execution by the working real-time CPU 106*a* and the Protection FSM 134*a* in execution by the protection real-time CPU 106*b* may be provided by the controller module 66 comprising the communication device 82 and the working real-time CPU 106*a* and the protection real-time CPU 106*b* hosting the TCP/IP stacks 206.

As shown in FIG. 9, the Y-cable FSM 134*a* may transition between a plurality of Y-cable states 900*a-n* in response to detecting one or more of a plurality of local Y-cable conditions 904*a-n* and/or a plurality of peer Y-cable conditions 908*a-n*. In the implementation shown, the Y-cable states 900*a-n* include an INIT state 900*a*, an ACTIVE UP state 900*b*, a LOCKED state 900*c*, a FORCED state 900*d*, an ACTIVE DOWN state 900*e*, a WTR RUNNING state 900*f*, an INACTIVE DOWN state 900*g*, and an INACTIVE UP state 900*h*.

When initialized, the Y-cable FSM 134*a* may begin in the INIT state 900*a*. When the Y-cable FSM 134*a* is initialized in the INIT state 900*a*, the real-time CPU 106*a*, 106*b* may maintain the laser 234*a*, 234*b* in the current state of the laser 234*a*, 234*b*; that is, the real-time CPU 106*a*, 106*b* may not send the control signals 200 to the FPGA 114*a*, 114*b* to cause the laser 234*a*, 234*b* to change from the current state of the laser 234*a*, 234*b*.

When the Y-cable FSM 134*a* transitions to the ACTIVE UP state 900*b*, the real-time CPU 106*a*, 106*b* may maintain the laser 234*a*, 234*b* in the activated state; that is, if the current state of the laser 234*a*, 234*b* is activated, the real-time CPU 106*a*, 106*b* may not send the control signals 200 to the FPGA 114*a*, 114*b* to activate the laser 234*a*, 234*b*, and if the current state of the laser 234*a*, 234*b* is deactivated, the real-time CPU 106*a*, 106*b* may send the control signals 200 to the FPGA 114*a*, 114*b* to activate the laser 234*a*, 234*b*.

In some implementations, the LOCKED state 900*c* is exclusive to the Protection FSM 134*a*. When the Y-cable FSM 134*a* transitions to the LOCKED state 900*c*, the real-time CPU 106*a*, 106*b* may maintain the laser 234*a*, 234*b* in the deactivated state; that is, if the current state of the laser 234*a*, 234*b* is deactivated, the real-time CPU 106*a*, 106*b* may not send the control signals 200 to the FPGA 114*a*, 114*b* to cause the laser 234*a*, 234*b* to change from the deactivated state, and if the current state of the laser 234*a*, 234*b* is activated, the real-time CPU 106*a*, 106*b* may send the control signals 200 to the FPGA 114*a*, 114*b* to cause the FPGA 114*a*, 114*b* to deactivate the laser 234*a*, 234*b*.

When the Y-cable FSM 134*a* transitions to the FORCED state 900*d*, the real-time CPU 106*a*, 106*b* may maintain the laser 234*a*, 234*b* in the activated state; that is, if the current state of the laser 234*a*, 234*b* is activated, the real-time CPU 106*a*, 106*b* may not send the control signals 200 to the FPGA 114*a*, 114*b* to activate the laser 234*a*, 234*b*, and if the current state of the laser 234*a*, 234*b* is deactivated, the real-time CPU 106*a*, 106*b* may send the control signals 200 to the FPGA 114*b* to cause the FPGA 114*a*, 114*b* to activate the laser 234*a*, 234*b*. In some implementations, only one of the Working FSM 134*a* and the Protection FSM 134*a* may be in the FORCED state 900*d* at any one time. As described further below, when one of the Working FSM 134*a* and the Protection FSM 134*a* transitions into the FORCED state 900*d*, the other of the Working FSM 134*a* and the Protection FSM 134*a* may detect the Peer FORCED condition 908*f* and transition into one of the INACTIVE DOWN state 900*g* and the INACTIVE UP state 900*h* and maintain the laser 234*a*, 234*b* in the deactivated state.

When the Y-cable FSM 134*a* transitions to the ACTIVE DOWN state 900*e*, the real-time CPU 106*a*, 106*b* may maintain the laser 234*a*, 234*b* in the activated state; that is, if the current state of the laser 234*a*, 234*b* is activated, the real-time CPU 106*a*, 106*b* may not send the control signals 200 to the FPGA 114*a*, 114*b* to activate the laser 234*a*, 234*b*, and if the current state of the laser 234*a*, 234*b* is deactivated, the real-time CPU 106*a*, 106*b* may send the control signals 200 to the FPGA 114*a*, 114*b* to activate the laser 234*a*, 234*b*. If both of the working line module 70*a* and the protection line module 70*b* experience a fault, then the current activation state of the lasers 234*a*, 234*b* is maintained.

When the Y-cable FSM 134*a* transitions to the WTR RUNNING state 900*f*, the real-time CPU 106*a*, 106*b* may start a Wait-to-Restore (WTR) timer having a predetermined duration. Further, while the Y-cable FSM 134*a* is in the WTR RUNNING state 900*f*, the real-time CPU 106*a*, 106*b* may maintain the laser 234*a*, 234*b* in the current state of the laser 234*a*, 234*b* until the WTR timer elapses. In some implementations, only the working real-time CPU 106*a* may start the WTR timer.

When the Y-cable FSM 134*a* transitions to the INACTIVE DOWN state 900*g*, the real-time CPU 106*a*, 106*b* may maintain the laser 234*a*, 234*b* in the deactivated state; that is, if the current state of the laser 234*a*, 234*b* is deactivated, the real-time CPU 106*a*, 106*b* may not send the control signals 200 to the FPGA 114*a*, 114*b* to deactivate the laser 234*a*, 234*b*, and if the current state of the laser 234*a*, 234*b* is activated, the real-time CPU 106*a*, 106*b* may send the control signals 200 to the FPGA 114*a*, 114*b* to deactivate the laser 234*a*, 234*b*.

When the Y-cable FSM 134*a* transitions to the INACTIVE UP state 900*h*, the real-time CPU 106*a*, 106*b* may maintain the laser 234a, 234b in the deactivated state; that is, if the current state of the laser 234a, 234b is deactivated, the real-time CPU 106a, 106b may not send the control signals 200 to the FPGA 114a, 114b to deactivate the laser 234a, 234b, and if the current state of the laser 234a, 234b is activated, the real-time CPU 106a, 106b may send the control signals 200 to the FPGA 114a, 114b to deactivate the laser 234a, 234b.

The Y-cable FSM 134a, when executed by the real-time CPU 106a, 106b, may cause the real-time CPU 106a, 106b to transmit a current state of the Y-cable FSM 134a to the application CPU 102a, 102b, the other real-time CPU 106a, 106b, and the controller module 66. In some implementations, the Y-cable FSM 134a causes the real-time CPU 106a, 106b to periodically transmit the current state of the Y-cable FSM 134a. In other implementations, the Y-cable FSM 134a causes the real-time CPU 106a, 106b to transmit the current state of the Y-cable FSM 134a in response to a change in the current state of the Y-cable FSM 134a.

The Y-cable FSM 134a may transition between the Y-cable states 900a-n in response to detecting one or more of the local Y-cable conditions 904a-n, which include a PU UP condition 904a, a PU DOWN condition 904b, a MANUAL SWITCH condition 904c, a NON-REVERTIVE condition 904d, a REVERTIVE condition 904e, a FORCED condition 904f, a FORCED CLEAR condition 904g, a LOCKOUT condition 904h, a LOCKOUT CLEAR condition 904i, and a WTR TIMER EXPIRY condition 904j.

The PU UP condition 904a may indicate that the protection unit (whether working or protection) is free of faults and is operational. The PU DOWN condition 904b may indicate that the protection unit is experiencing a fault and is non-operation. The MANUAL SWITCH condition 904c may indicate that a user has initiated a maintenance command to activate a path (whether working or protection). The NON-REVERTIVE condition 904d may indicate that a user has set the protection group as non-revertive, which may maintain the protection laser 234b of the protection line module 70b in an activated state even if the working line module 70b is free of faults and is capable of becoming active; however, in such an instance, the working line module 70b may maintain the working laser 234a of the working line module 70b in a deactivated state. The REVERTIVE condition 904e may indicate that a user has set the protection group as revertive, which may cause the working real-time CPU 102a to send the control signals 200 to the working FPGA 114a to activate the working laser 234a after expiration of the WTR timer which is started upon the Working FSM 134a becoming free of faults. The FORCED condition 904f may indicate that the controller module 66 has commanded that the Y-cable FSM 134a should transition into the FORCED state 900d. The FORCED CLEAR condition 904g may indicate that the controller module 66 has commanded that the Y-cable FSM 134a should transition out of the FORCED state 900d. The LOCKOUT condition 904h may indicate that a user has commanded that the Y-cable FSM 134a should transition into the LOCKED state 900c. The LOCKOUT CLEAR condition 904i may indicate that a user has commanded that the Y-cable FSM 134a should transition out of the LOCKED state 900c. The WTR TIMER EXPIRY condition 904j may indicate that the WTR timer has elapsed.

The Y-cable FSM 134a may also transition between the Y-cable states 900a-n in response to detecting one or more of the peer Y-cable conditions 908a-n. Each of the peer Y-cable conditions 908a-n may be indicative of a current state of the Y-cable FSM 134a in the other real-time CPU 106a, 106b, and may be transmitted between the real-time CPUs 106a, 106b periodically or in response to a change in the current state of the Y-cable FSM 134a in the other real-time CPU 106a, 106b. The peer Y-cable conditions 908a-n include a peer INACTIVE UP condition 908a, a peer INACTIVE DOWN condition 908b, a peer ACTIVE UP condition 908c, a peer ACTIVE DOWN condition 908d, a peer LOCKED condition 908e, and a peer FORCED condition 908f.

The Y-cable FSM 134a may also transition between the Y-cable states 900a-n based on whether the Y-cable FSM 134a is designated as the Working FSM 134a or the Protection FSM 134a; that is, the Y-cable FSM 134a may transition between the Y-cable states 900a-n based on a WORKING FSM condition 912a or a PROTECTION FSM condition 912b.

From the INIT state 900a, the Y-cable FSM 134a may transition to: the ACTIVE UP state 900b in response to detecting the PU UP condition 904a and one of the Peer INACTIVE UP condition 908a and the Peer INACTIVE DOWN condition 908b; the ACTIVE DOWN state 900e in response to detecting the PU DOWN condition 904b and one of the Peer INACTIVE DOWN condition 908d and the Peer LOCKED condition 908e; the INACTIVE DOWN state 900g in response to detecting the PU DOWN condition 904b and one of the Peer ACTIVE UP condition 908c and the Peer ACTIVE DOWN condition 908d; and the INACTIVE UP state 900h in response to detecting the PU UP condition 904a and the Peer ACTIVE UP condition 908c.

From the ACTIVE UP state 900b, the Y-cable FSM 134a may transition to: the LOCKED state 900c in response to detecting the PROTECTION FSM condition 912b and the LOCKOUT condition 904h; the FORCED state 900d in response to detecting the FORCED condition 904f; the INACTIVE DOWN state 900g in response to detecting the PU DOWN condition 904b; and the INACTIVE UP state 900h in response to detecting the MANUAL SWITCH condition 904c.

From the LOCKED state 900c, the Y-cable FSM 134a may transition to: the INACTIVE DOWN state 900g in response to detecting the LOCKOUT CLEAR condition 904i and the PU DOWN condition 904b; and the INACTIVE UP state 900h in response to detecting the LOCKOUT CLEAR condition 904i and the PU UP condition 904a.

From the FORCED state 900d, the Y-cable FSM 134a may transition to: the ACTIVE UP state 900b in response to detecting the PU UP condition 904a, the FORCED CLEAR condition 904g, and the WORKING FSM condition 912a; the LOCKED state 900c in response to detecting the LOCKOUT condition 904h and the PROTECTION FSM condition 912b; the ACTIVE DOWN state 900e in response to detecting the PU DOWN condition 904b, the FORCED CLEAR condition 904g, and the Peer INACTIVE DOWN condition 908b; and the INACTIVE DOWN state 900g in response to detecting the PU DOWN condition 904b and the FORCED CLEAR condition 904g.

From the ACTIVE DOWN state 900e, the Y-cable FSM 134a may transition to: the ACTIVE UP state 900b in response to detecting the PU UP condition 904a; the LOCKED state 900c in response to detecting the LOCKOUT condition 904h and the PROTECTION FSM condition 912b; the FORCED state 900d in response to detecting the FORCED condition 904f; and the INACTIVE DOWN state 900g in response to detecting the Peer ACTIVE UP condition 908c.

From the WTR RUNNING state 900f, the Y-cable FSM 134a may transition to: the ACTIVE UP state 900b in response to detecting the WTR TIMER EXPIRY condition 904*j*; the FORCED state 900*d* in response to detecting the FORCED condition 904*f*; the INACTIVE DOWN state 900*g* in response to detecting the PU DOWN condition 904*b*, the REVERTIVE condition 904*e*, and the WORKING FSM condition 912*a*; and the INACTIVE UP state 900*h* in response to detecting the Peer FORCED condition 908*f*.

From the INACTIVE DOWN state 900*g*, the Y-cable FSM 134*a* may transition to: the ACTIVE UP state 900*b* in response to detecting the PU UP condition 904*a*, the REVERTIVE condition 904*e*, and the Peer ACTIVE DOWN condition 908*d*; the FORCED state 900*d* in response to detecting the FORCED condition 904*f*; the WTR RUNNING state 900*f* in response to detecting the PU UP condition 904*a*, the REVERTIVE condition 904*e*, and the WORKING FSM condition 912*a*; and the INACTIVE UP state 900*h* in response to detecting the PU UP condition 904*a* and the NON-REVERTIVE condition 904*d*.

From the INACTIVE UP state 900*i*, the Y-cable FSM 134*a* may transition to: the ACTIVE UP state 900*b* in response to detecting the MANUAL SWITCH condition 904*c*; the FORCED state 900*d* in response to detecting the FORCED condition 904*f*; and the INACTIVE DOWN state 900*g* in response to detecting the PU DOWN condition 904*b*.

From any of the Y-cable states 900*a-n*, the Y-cable FSM 134*a* may transition to: the INACTIVE UP state 900*h* in response to detecting the PU UP condition 904*a* and the Peer FORCED condition 908*l*; and the INACTIVE DOWN state 900*g* in response to detecting the PU DOWN condition 904*b* and the Peer FORCED condition 908*f*.

From the above description, it is clear that the inventive concept(s) disclosed herein are well adapted to carry out the objects and to attain the advantages mentioned herein, as well as those inherent in the inventive concept(s) disclosed herein. While the embodiments of the inventive concept(s) disclosed herein have been described for purposes of this disclosure, it will be understood that numerous changes may be made and readily suggested to those skilled in the art which are accomplished within the scope and spirit of the inventive concept(s) disclosed herein.

What is claimed is:

1. A system, comprising:
   an optical network comprising a first optical fiber and a second optical fiber, the first optical fiber being a component of a working path in the optical network, the second optical fiber being a component of a protection path in the optical network; and
   a terminal node, comprising:
      a first line module comprising a first coherent optical transceiver comprising a first laser operable to supply a first optical signal, a first line port connected to the first optical fiber, a first embedded device, and a first real time processor dedicated to protection signaling mechanisms within the optical network; and
      a second line module comprising a second coherent optical transceiver comprising a second laser operable to supply a second optical signal, a second line port connected to the second optical fiber, a second embedded device, and a second real time processor dedicated to protection signaling mechanisms of the optical network;
   wherein the first embedded device is operable generate a first fault signal, and transmit the first fault signal to the first real time processor;
   wherein the first real time processor is operable to receive the first fault signal and, responsive to receiving the first fault signal, trigger the first embedded device to deactivate the first laser, generate a second fault signal, and transmit the second fault signal to the second real time processor; and
   wherein the second real time processor is operable to receive the second fault signal and, responsive to receiving the second fault signal, trigger the second embedded device to activate the second laser.

2. The system of claim 1, wherein the first line module further comprises a non-real time processor, wherein the non-real time processor is operable to provide non-real time processing of configuration and status handling.

3. The system of claim 2, wherein the non-real time processor executes at least one microservice operable to provide the non-real time processing of configuration and status handling.

4. The system of claim 1, wherein the first line module further comprises a non-real time processor, wherein the non-real time processor is operable to provide non-real time reboot synchronization.

5. The system of claim 1, wherein at least one of the first line module and the second line module further comprises a non-real time processor and a shared memory, wherein the non-real time processor is operable to obtain a protection group signal identifying a protection group comprising a destination node, the working path, and the protection path, wherein the destination node is the terminal node, wherein the non-real time processor is further operable to store data identifying the protection group in the shared memory.

6. The system of claim 5, wherein the non-real time processor is operable to subscribe to a protection group data stream, wherein the protection group signal is obtained via the protection group data stream.

7. The system of claim 6, wherein the terminal node further comprises a controller module comprising a controller processor and a non-transitory computer-readable medium storing processor-executable code that when executed by the controller processor causes the controller processor to receive an input from a user, the input being indicative of the protection group, and publish the protection group signal to the protection group data stream.

8. The system of claim 1, wherein the first embedded device is operable to detect a fault in the working path and to generate the first fault signal in response to detecting the fault.

9. The system of claim 1, wherein the first embedded device is configured to provide real-time fault detection.

10. The system of claim 1, wherein the first embedded device is configured with interrupt-based reporting, and wherein the first fault signal is an interrupt signal.

11. A line module in a terminal node of an optical network, comprising:
   a coherent optical transceiver comprising a laser operable to supply an optical signal, the laser having an activation state being activated or deactivated;
   a line port configured to be connected to an optical fiber;
   an embedded device; and
   a real time processor dedicated to protection signaling mechanisms within the optical network;
   wherein the embedded device is operable to detect a fault in the optical fiber and, responsive to detecting the fault, transmit a first fault signal to the real time processor; and
   wherein the real time processor is operable to receive one of the first fault signal and a second fault signal, and, responsive to receiving the first fault signal or the second fault signal, trigger the embedded device to switch the activation state of the laser, and, further responsive to receiving the first fault signal, generate a third fault signal and transmit the third fault signal.

12. The line module of claim 11, further comprising a non-real time processor, wherein the non-real time processor is operable to provide non-real time processing of configuration and status handling.

13. The line module of claim 12, wherein the non-real time processor executes at least one microservice operable to provide the non-real time processing of configuration and status handling.

14. The line module of claim 11, further comprising a non-real time processor, wherein the non-real time processor is operable to provide non-real time reboot synchronization.

15. The line module of claim 11, further comprising a non-real time processor and a shared memory, wherein the non-real time processor is operable to obtain a protection group signal identifying a protection group comprising a destination node, a working path, and a protection path, wherein the destination node is the terminal node and the optical fiber is a component of one of the working path and the protection path, and the non-real time processor is further operable to store data indicative of the protection group in the shared memory.

16. The line module of claim 15, wherein the non-real time processor is operable to subscribe to a protection group data stream, wherein the protection group signal is obtained via the protection group data stream.

17. The line module of claim 16, further comprising a controller module comprising a controller processor and a non-transitory computer-readable medium storing processor-executable code that when executed by the controller processor causes the controller processor to receive an input from a user, the input being indicative of the protection group, and publish the protection group signal to the protection group data stream.

18. The line module of claim 11, wherein the embedded device is configured to provide real-time fault detection.

19. The line module of claim 11, wherein the embedded device is configured with interrupt-based reporting, and wherein the first fault signal is an interrupt signal.

20. A method, comprising:
detecting, by a first embedded device of a first line module comprising a first line port connected to a first optical fiber, a fault in the first optical fiber;
responsive to detecting the fault, generating, by the first embedded device, a first fault signal and transmitting, by the first embedded device, the first fault signal to a first real time processor of the first line module;
responsive to receiving the first fault signal, triggering, by the first real time processor, the first embedded device to deactivate a first laser of a first coherent optical transceiver of the first line module, the first laser being operable to supply a first optical signal, and transmitting, by the first real time processor, a second fault signal to a second real time processor of a second line module comprising a second line port connected to a second optical fiber; and
responsive to receiving the second fault signal, triggering, by the second real time processor, a second embedded device of the second line module to activate a second laser of a second coherent optical transceiver of the second line module, the second laser being operable to supply a second optical signal.

* * * * *